(12) United States Patent
Martin et al.

(10) Patent No.: US 7,686,576 B2
(45) Date of Patent: Mar. 30, 2010

(54) METHOD AND APPARATUS FOR ASSEMBLING GAS TURBINE ENGINES

(75) Inventors: Nicholas Francis Martin, Simpsonville, SC (US); Stephen Paul Wassynger, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 648 days.

(21) Appl. No.: 11/552,212

(22) Filed: Oct. 24, 2006

(65) Prior Publication Data
US 2010/0028146 A1 Feb. 4, 2010

(51) Int. Cl.
*F01D 25/26* (2006.01)
(52) U.S. Cl. .............. 415/137; 415/138; 415/209.2; 415/209.3
(58) Field of Classification Search .......... 415/137, 415/138, 209.2, 209.3, 209.4, 210.1
See application file for complete search history.

(56) References Cited

U.S. PATENT DOCUMENTS

| 2,625,013 | A | * | 1/1953 | Howard et al. .......... 415/209.2 |
| 3,976,394 | A | | 8/1976 | Tarter et al. |
| 3,997,280 | A | * | 12/1976 | Germain .................... 415/189 |
| 5,022,818 | A | * | 6/1991 | Scalzo ...................... 415/209.3 |
| 6,183,195 | B1 | | 2/2001 | Tremaine |
| 6,908,278 | B2 | | 6/2005 | Brunet et al. |
| 7,090,462 | B2 | | 8/2006 | Martin et al. |
| 2004/0191058 | A1 | | 9/2004 | Baumann et al. |
| 2006/0045747 | A1 | * | 3/2006 | Martin et al. .......... 416/219 R |

* cited by examiner

*Primary Examiner*—Igor Kershteyn
(74) *Attorney, Agent, or Firm*—Armstrong Teasdale LLP

(57) ABSTRACT

A method of operating a gas turbine engine includes forming at least one stator ring passage within at least a portion of a radially inner surface of a casing. The method also includes providing at least one stator ring segment that is sized to be inserted into the at least one stator ring passage. The method further includes forming at least one radial passage within at least a portion of the at least one stator ring segment such that at least a portion of the at least one radial passage is adjacent to at least one substantially axial stator blade passage.

17 Claims, 5 Drawing Sheets

US 7,686,576 B2

METHOD AND APPARATUS FOR ASSEMBLING GAS TURBINE ENGINES

BACKGROUND OF THE INVENTION

The present invention relates generally to gas turbine engines, and more particularly, to methods and apparatus for providing bleeding airflow in a compressor associated with a gas turbine engine.

At least some components of known gas turbines may be subjected to high temperature environments, and cooling of such components may extend their useful life. At least one known cooling method includes channeling at least a portion of air from a compressor to components desired to be cooled. Generally, the methods and apparatus for channeling such air is referred to as compressor bleed. Some known compressor bleeds also facilitate reducing compressor stalling and/or compressor surges during compressor operation.

Known compressor bleeds channel a pre-determined percentage of the compressor's rated air flow from pre-determined locations defined within the compressor casing. However, some known compressor bleeds are defined in areas that may facilitate flow path distortion and/or structural weakening of the compressor casing. Furthermore, the existing configuration of many known compressor bleeds are not easily modifiable to accommodate changes to the configuration and/or operation of the gas turbine.

BRIEF DESCRIPTION OF THE INVENTION

In one aspect, a method of operating a gas turbine engine is provided. The method includes forming at least one stator ring passage within at least a portion of a radially inner surface of a casing. The method also includes providing at least one stator ring segment that is sized to be inserted into the at least one stator ring passage. The method further includes forming at least one radial passage within at least a portion of the at least one stator ring segment such that at least a portion of the at least one radial passage is adjacent to at least one substantially axial stator blade passage.

In another aspect, a stator assembly is provided. The stator assembly includes a substantially cylindrical casing comprising a radially inner surface. The assembly also includes at least one stator ring passage formed within at least a portion of the radially inner surface. The assembly further includes at least one stator ring segment inserted within at least a portion of the at least one stator ring passage. The assembly also includes at least one stator blade passage formed in at least a portion of the at least one stator ring segment. The assembly further includes at least one radial passage formed within at least a portion of the at least one stator ring segment, the at least one radial passage is at least partially adjacent to the at least one stator blade passage.

In a further aspect, a gas turbine engine is provided. The engine includes a compressor rotatably coupled to the turbine. The compressor includes a substantially cylindrical casing having a radially inner surface. The compressor also includes at least one stator ring passage formed within at least a portion of the radially inner surface. The compressor further includes at least one stator ring segment inserted within at least a portion of the at least one stator ring passage. The compressor also includes at least one stator blade passage formed in at least a portion of the at least one stator ring segment. The compressor further includes at least one radial passage formed within at least a portion of the at least one stator ring segment, the at least one radial passage is at least partially adjacent to the at least one stator blade passage.

DETAILED DESCRIPTION OF THE INVENTION

Figure 1:
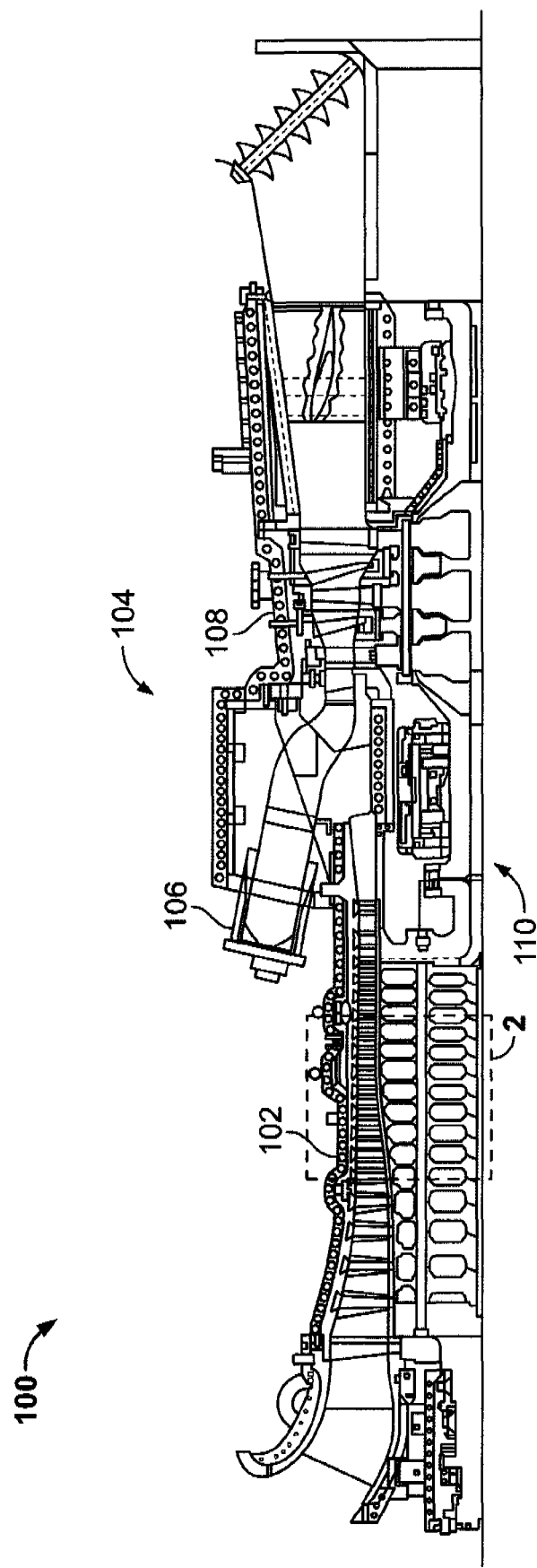
FIG. 1 is a schematic view of an exemplary gas turbine engine.

FIG. 1 is a schematic illustration of an exemplary gas turbine engine 100. Engine 100 includes a compressor 102 and a plurality of combustors 104. Combustor 104 includes a fuel nozzle assembly 106. Engine 100 also includes a turbine 108 and a common compressor/turbine rotor 110 (sometimes referred to as rotor 110). In one embodiment, engine 100 is a MS9001E engine, sometimes referred to as a 9E engine, commercially available from General Electric Company, Greenville, S.C.

Figure 2:
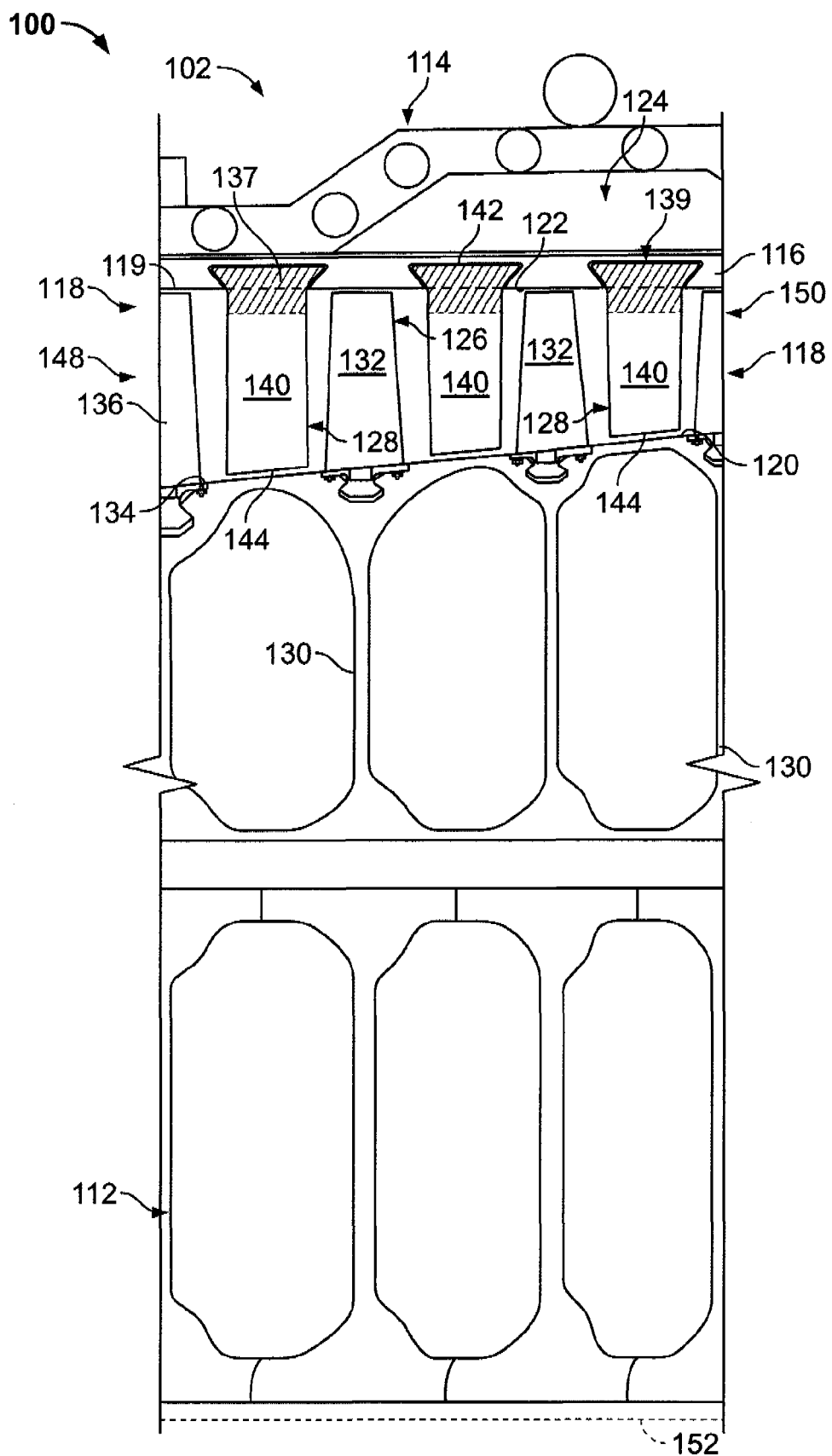
FIG. 2 is an enlarged cross-sectional view of a portion of a compressor that may be used with the gas turbine engine shown in FIG. 1 and taken along area 2.

FIG. 2 is an enlarged cross-sectional view of a portion of compressor 102 used with gas turbine engine 100 and taken along area 2 (shown in FIG. 1). Compressor 102 includes a rotor assembly 112 and a stator assembly 114 that are positioned within a casing 116 that at least partially defines a flow path 118 in conjunction with at least a potion of a casing radially inner surface 119. In the exemplary embodiment, rotor assembly 112 forms a portion of rotor 110 and is rotatably coupled to a turbine rotor (not shown). Rotor assembly 112 also partially defines an inner flow path boundary 120 of flow path 118, and stator assembly 114 partially defines an outer flow path boundary 122 of flow path 118, in cooperation with inner surface 119. Alternatively, stator assembly 114 and casing 116 are formed as a unitary and/or integrated component (not shown).

Compressor 102 includes a plurality of stages 124, wherein each stage 124 includes a row of circumferentially-spaced rotor blade assemblies 126 and a row of stator blade assemblies 128, sometimes referred to as stator vanes. Rotor blade assemblies 126 are coupled to a rotor disk 130 such that each blade assembly 126 extends radially outwardly from rotor disk 130. Moreover, each assembly 126 includes a rotor blade airfoil portion 132 that extends radially outward from an inner blade coupling apparatus 134 to a rotor blade tip portion 136. Compressor stages 124 cooperate with a motive or working fluid including, but not limited to, air, such that the motive fluid is compressed in succeeding stages 124.

Stator assembly 114 includes a plurality of rows of stator rings 137, sometimes referred to as stator-in-rings, stator support rings, and/or stator dovetail rings. Rings 137 are inserted into passages or channels 139 that are circumferentially formed in axial succession within at least a portion of casing 116. Each channel 139 is defined to be substantially axially adjacent to a portion of casing 116 that is opposite rotor blade tip portions 136. Each stator ring 137 is sized and shaped to receive a plurality of stator blade assemblies 128 such that each row of blade assemblies 128 is positioned between a pair of axially adjacent rows of rotor blade assemblies 126. In the exemplary embodiment, each blade assembly 128 includes an airfoil portion 140 that extends from a stator blade dovetail portion (not shown in FIG. 2) to a stator blade tip portion 144. Compressor 102 includes one row of stator vanes 138 per stage 124, some of which are bleed stages (not shown in FIG. 2). Moreover, in the exemplary embodiment, compressor 102 is substantially symmetrical about an axial centerline 152.

In operation, compressor 102 is rotated by turbine 108 via rotor 110 wherein rotor 110 includes compressor rotor 112. Fluid collected from a low pressure region 148 via a first stage of compressor 102 is channeled by rotor blade airfoil portions 132 towards airfoil portions 140 of stator blade assemblies 128. The fluid is at least partially compressed and a pressure of the fluid is at least partially increased as the fluid is channeled through the remainder of flow path 118. More specifically, the fluid continues to flow through subsequent stages that are substantially similar to the first stage 124 with the exception that flow path 118 narrows with successive stages to facilitate compressing and pressurizing the fluid as it is channeled through flow path 118. The compressed and pressurized fluid is subsequently channeled into a high pressure region 150 such that it may be used within turbine engine 100.

Figure 3:
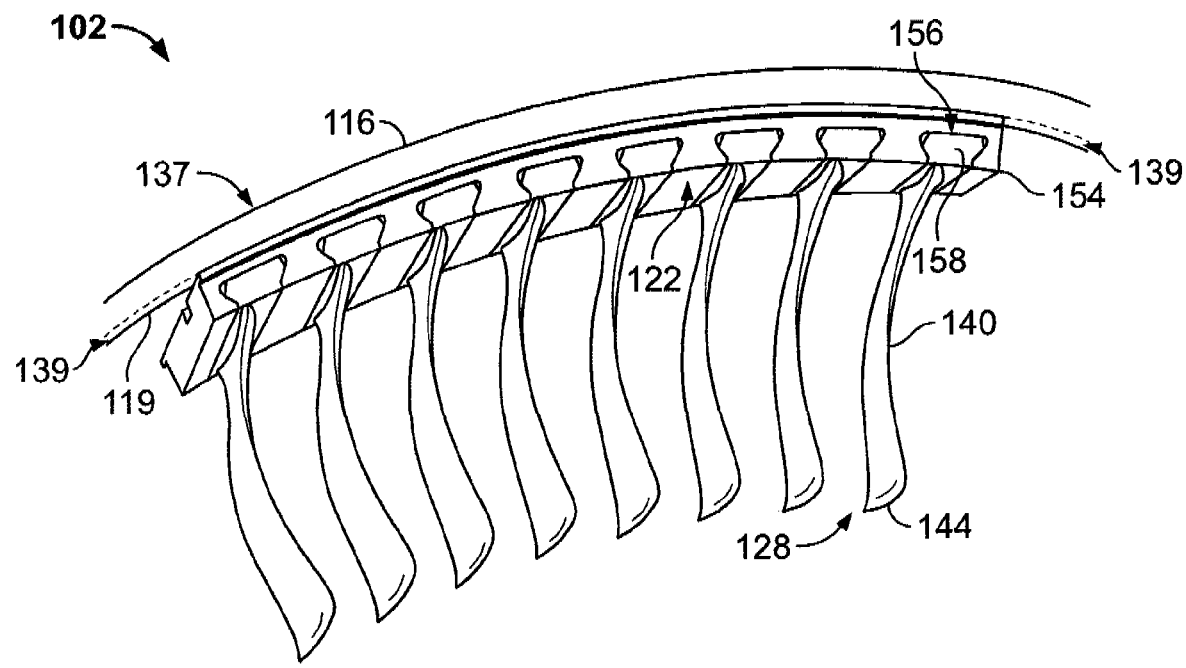
FIG. 3 is a perspective view of an exemplary stator blade ring segment that may be used with the compressor shown in FIG. 2.

FIG. 3 is a perspective view of an exemplary stator blade ring segment 154 that may be used with compressor 102 (shown in FIG. 2). In the exemplary embodiment, segment 154 includes a plurality of stator blade passages 156 that are each defined generally axially within segment 154. Moreover, each passage 156 is sized and shaped to receive a stator blade assembly 128. Each assembly 128 includes a stator blade dovetail portion 158 that enables stator blade assemblies 128 to be coupled to casing 116 via stator blade passages 156. In the exemplary embodiment, each stator blade ring segment 154 is coupled to casing 116 via coupling methods that include, but are not limited to, a friction fit, the use of retention hardware (not shown), a welding process, or any other mechanical coupling means, and forming segments 154 integrally with casing 116. A plurality of ring segments 154 are inserted into each channel 139 such that segments 154 extend substantially circumferentially within compressor casing 116 and such that circumferentially adjacent segments 154 abut each other. As such, ring segments 154 form at least a portion of outer path flow boundary 122.

Figure 4:
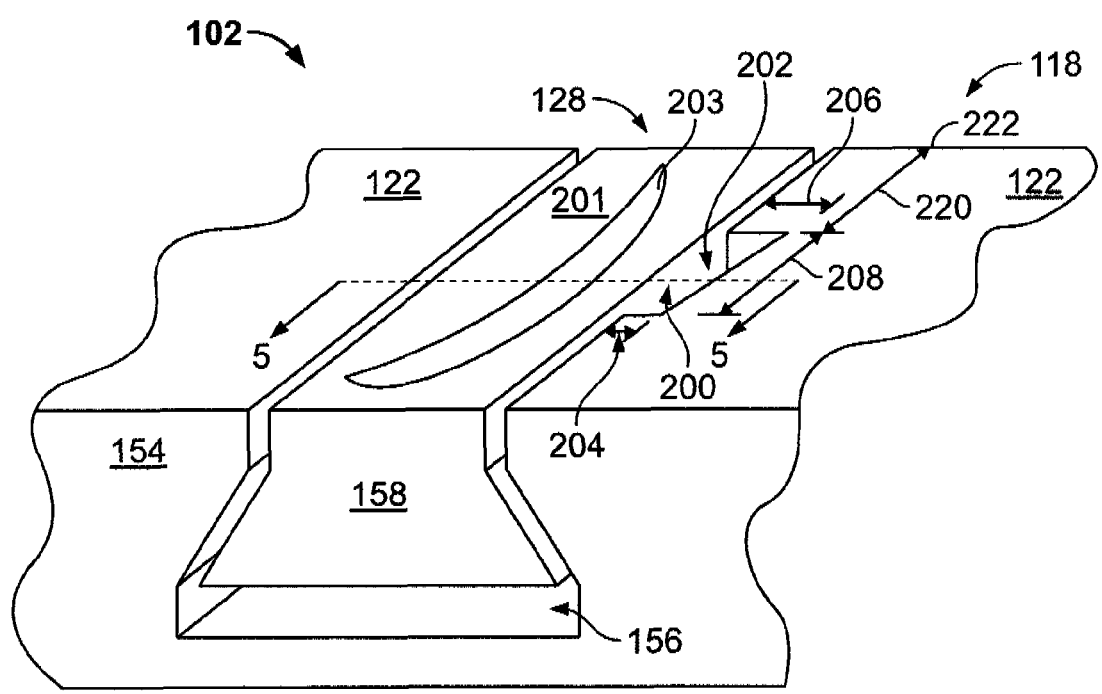
FIG. 4 is a perspective view of an exemplary bleed slot defined within a portion of the compressor shown in FIG. 2.
Figure 5:
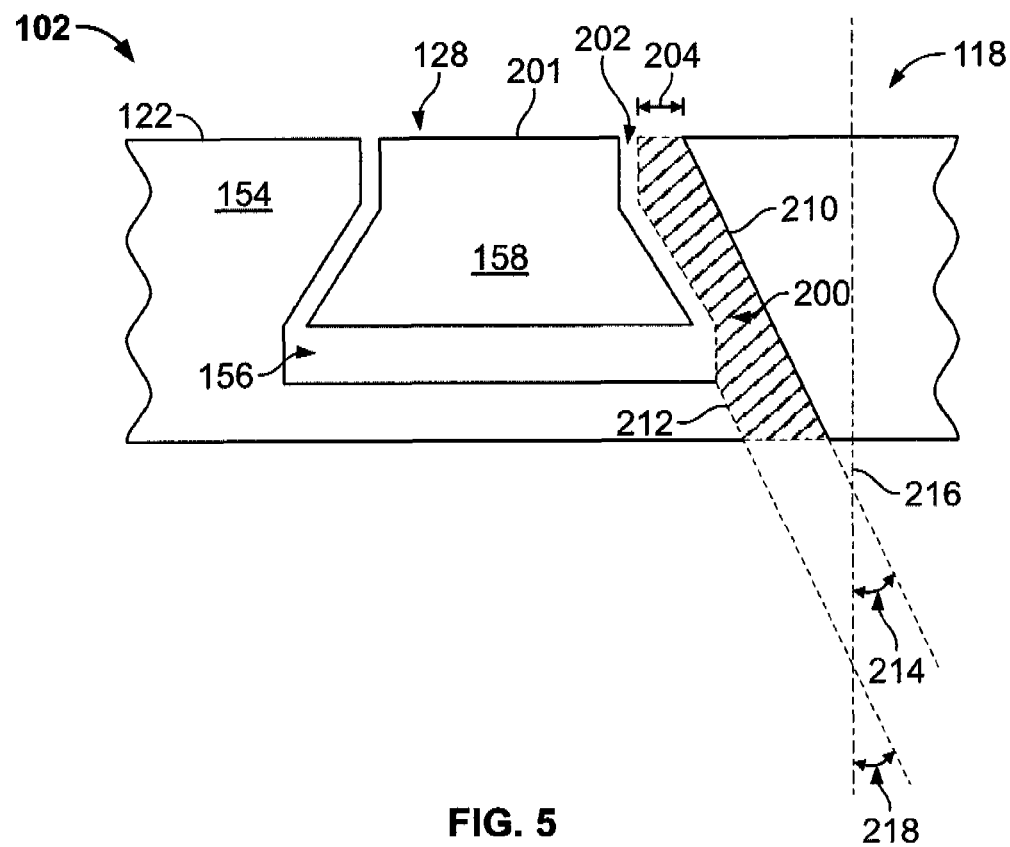
FIG. 5 is a cross-sectional view of the bleed slot shown in FIG. 4 taken along line 5-5.

FIG. 4 is a perspective view of a bleed passage or bleed slot 200 defined within a portion of compressor 102. FIG. 5 is a cross-sectional view of bleed slot 200 taken along line 5-5 (shown in FIG. 4). For reference purposes only, FIGS. 4 and 5 illustrate a portion of compressor 102 below centerline 152 (shown in FIG. 2). In FIG. 5, those portions of segment 154 that axially extend away from slot 200 are illustrated in phantom for perspective. Passage 156 is sized and shaped to receive at least one stator blade dovetail portion 158 therein such that stator blade assembly 128 is secured in a pre-determined position. For reference, a portion of a stator blade root portion 203 is illustrated in FIG. 4. More specifically, when each dovetail portion 158 is inserted within passage 156, a radially outer surface 201 of dovetail portion 158 intersects stator blade assembly root portion 203 such that portion 201 is substantially flush with, or is substantially co-planar/co-arcuate with, outer flow path boundary 122.

In the exemplary embodiment, bleed slot 200 is defined substantially radially within ring segment 154. Slot 200 includes an opening 202 that is substantially flush with or co-planar/co-arcuate with boundary 122. In the exemplary embodiment, slot 200 is partially defined by a first circumferential width 204, a second circumferential width 206, and an axial length 208. More specifically, in the exemplary embodiment, width 206 is wider than width 204. Alternatively, widths 204 and 206 may have any dimensions that facilitate operation of slot 200 as described herein. Also, in the exemplary embodiment, slot 200 dimensions define a substantially rectangular configuration. Alternatively, slot 200 dimensions may define any non-rectangular, such as, but not limited to, a semi-circular shape and/or a semi-elliptical shape. Moreover, in the exemplary embodiment, slot 200 is at least partially defined by a slot first wall 210 and a slot second wall 212 formed within segment 154.

In the Exemplary embodiment, wall 210 is formed within at a first wall angle 214 that is acute measured with respect to a radial axis 216 of compressor 102. Moreover, in the exemplary embodiment, wall 212 is formed within segment 154 at a second wall angle 218 that is acute measured with respect to radial axis 216. Also, in the exemplary embodiment, angles 214 and 218 are substantially similar. Alternatively, angles 214 and 218 may be any angles that facilitate operation of slot 200 as described herein, including obtuse angles and zero angles, measured with respect to radial axis 216. Furthermore, slot 200 is positioned an axial distance 220 from at least one axial edge 222 of segment 154. Widths 204 and 206, length 208, angles 214 and 218, and distance 220 are variably selected based at least partially on material properties of segment 154, axial position within compressor 102, bleed fluid flow requirements for operation of compressor 102 and a remainder of engine 100, and fluid flow characteristics in the vicinity of slot 200.

Forming slot 200 within segment 154 provides a plurality of benefits. For example, forming slot 200 as described herein facilitates retrofitting existing in-service compressors and reducing hardware modifications. As a result, slot 200 also facilitates reducing capital and labor costs associated with the modifications. Moreover, slot 200 may be optimally dimensioned and positioned to facilitate reducing fluid flow path distortion, changes to existing segment 154 natural frequencies, structural weakening of segment 154 and/or frequency tuning for segment 154.

A method of operating a gas turbine engine 100 is provided. The method includes forming at least one stator ring passage, or channel 139 within at least a portion of radially inner surface 119 of casing 116. The method also includes providing at least one stator ring segment 154 that is sized to be inserted into stator ring passage 139. The method further includes forming at least one stator blade passage 156 in at least a portion of stator ring segment 154. The method also includes forming at least one radial passage, or slot 200 within at least a portion of stator ring segment 139 such that at least a portion of slot 200 is adjacent to stator blade passage 156.

During operation, at least a portion of the fluid being compressed flowing through flow path 118 is channeling into slot 200 and through segment 154 wherein the fluid is further channeled to fluid conduits (not shown) that may include, but not be limited to, tubing, piping, and fluid manifolds.

Figure 6:
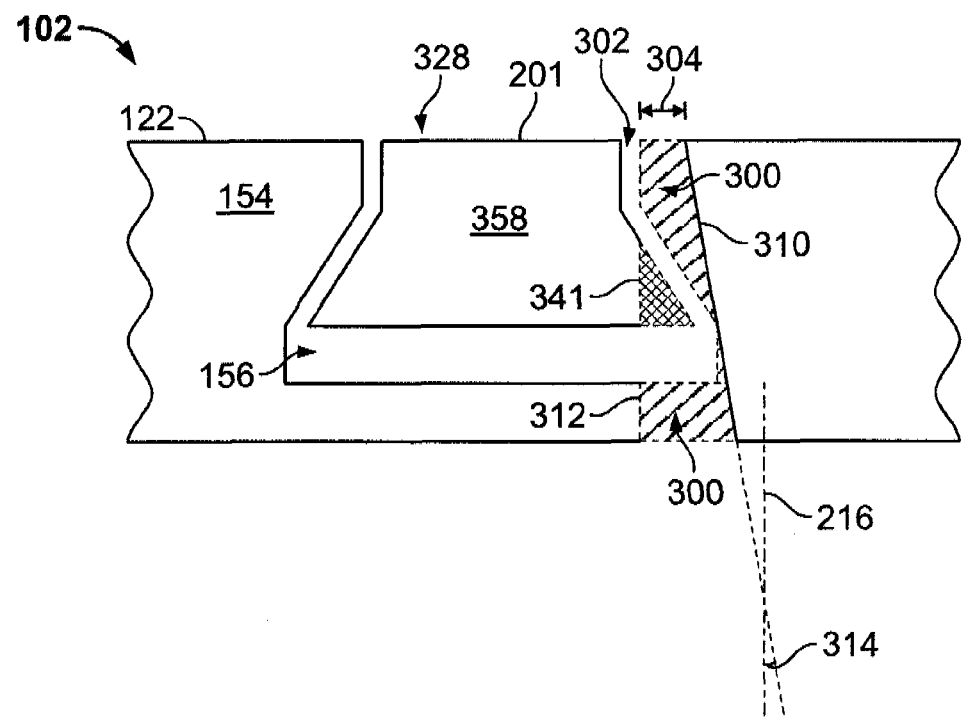
FIG. 6 is a cross-sectional view of an alternative bleed slot that may be defined within a portion of the compressor shown in FIG. 2.

FIG. 6 is a cross-sectional view of an alternative bleed slot 300 that may be defined within a portion of compressor 102 (shown in FIG. 2). In the alternative embodiment, slot 300 includes an opening 302 that is partially defined by a first circumferential width 304, a second circumferential width, and an axial length (both not shown) wherein the widths may have any dimensions that facilitate operation of slot 300 as described herein. Moreover, in the alternative embodiment, slot 300 is at least partially defined by a slot first wall 310 and a slot second wall 312 formed within segment 154.

In the alternative embodiment, wall 310 is formed at a first wall angle 314 that is acute measured with respect to radial axis 216 of compressor 102. Moreover, in the alternative embodiment, wall 312 is also formed at a second wall angle (not shown) measured with respect to radial axis 216. Also, in the alternative embodiment, angle 314 is smaller than angle 214 (shown in FIG. 4) and the angle associated with wall 312 is smaller than angle 218 (shown in FIG. 4). Alternatively, angle 314 and the angle associated with wall 312 may be any angles that facilitate operation of slot 300 as described herein, including obtuse and zero angles with respect to radial axis 216.

In the alternative embodiment, slot 300 includes a portion 341 of an alternative stator blade dovetail portion 358 that is removed to facilitate defining slot 300. Furthermore, slot 300 is positioned an axial distance (not shown) from axial edge 222 (shown in FIG. 4) of segment 154. Such dimensions are variably selected based at least partially on material properties of segment 154, axial position within compressor 102, bleed fluid flow requirements for operation of compressor 102 and a remainder of engine 100, and fluid flow characteristics in the vicinity of slot 300.

Figure 7:
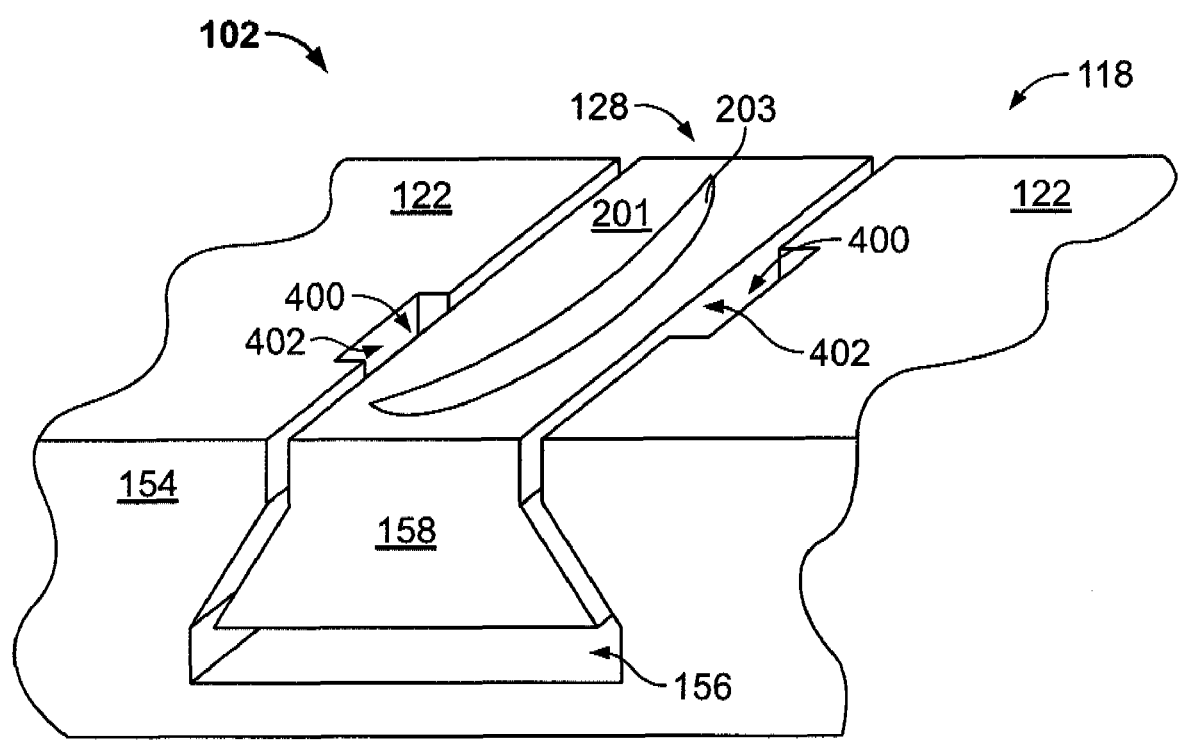
FIG. 7 is a perspective view of a plurality of bleed slots defined within a portion of the compressor shown in FIG. 2.

FIG. 7 is a perspective view of a plurality of bleed slots 400 defined within a portion of compressor 102 (shown in FIG. 2). Slots 400 include opening 402 and may be substantially similar to slot 200 (shown in FIGS. 4 and 5) and/or slot 400 (shown in FIG. 6). Alternatively, any number of slots 400 with any dimensions and any configuration may be formed within ring segment 154 that facilitates operation of compressor 102 as described herein.

The method and apparatus for assembling a compressor as described herein facilitates operation of a turbine engine. Specifically, at least one bleed slot formed within a stator ring as described above facilitates an effective compressor bleed configuration. More specifically, such configuration facilitates optimally dimensioned and positioned slots to facilitate reducing fluid flow path distortion, reducing changes to existing stator rings' natural frequencies, reducing structural weakening of stator rings and facilitate frequency tuning for stator rings. Moreover, a method of forming such slots as described herein facilitates retrofitting existing in-service compressors by reducing hardware modifications as well as reducing capital and labor costs associated with affecting such modifications.

Exemplary embodiments of compressor bleed slots as associated with turbine engines are described above in detail. The methods, apparatus and systems are not limited to the specific embodiments described herein nor to the specific illustrated compressor bleed slots.

While the invention has been described in terms of various specific embodiments, those skilled in the art will recognize that the invention can be practiced with modification within the spirit and scope of the claims.

What is claimed is:

1. A method of assembling a gas turbine engine, said method comprising:
   forming at least one stator ring passage within at least a portion of a radially inner surface of a casing;
   providing at least one stator ring segment that is sized to be inserted into the at least one stator ring passage;
   forming at least one substantially axial stator blade passage in at least a portion of the at least one stator ring segment;
   inserting a dovetail portion of at least one stator blade into at least a portion of the at least one substantially axial stator blade passage; and
   forming at least one radial passage by removing at least a portion of the at least one stator ring segment and at least a portion of the dovetail portion of the at least one stator blade such that at least a portion of the at least one radial passage is adjacent to the at least one substantially axial stator blade passage.

2. A method in accordance with claim 1 wherein forming at least one radial passage comprises forming a plurality of radial passages, wherein the plurality of radial passages are substantially circumferentially opposite to each other.

3. A method in accordance with claim 1 further comprising:
   providing a rotor including at least one rotor blade coupled to the rotor; and
   positioning the at least one rotor blade adjacent to the at least one stator blade, such that the at least one rotor blade and the at least one stator blade cooperate to increase a pressure of a fluid channeled through the engine.

4. A stator assembly comprising:
   a substantially cylindrical casing comprising a radially inner surface;
   at least one stator ring passage formed within at least a portion of said radially inner surface;
   at least one stator ring segment inserted within at least a portion of said at least one stator ring passage;
   at least one stator blade passage formed in at least a portion of said at least one stator ring segment;
   at least one stator blade comprising a dovetail portion inserted into at least a portion of said stator blade passage; and
   at least one radial passage formed within at least one of at least a portion of said at least one stator ring segment and at least a portion of said dovetail portion, said at least one radial passage is at least partially adjacent to said at least one stator blade passage.

5. A stator assembly in accordance with claim 4 wherein said at least one radial passage is defined at a predetermined axial and circumferential position within said at least one stator ring segment.

6. A stator assembly in accordance with claim 4 wherein said at least one passage is at least partially defined by at least one wall formed within at least a portion of said at least one stator ring segment, by an opening formed in a radially innermost portion of said at least one stator ring segment, and by a radially outermost portion of said at least one stator ring segment.

7. A stator assembly in accordance with claim 6 wherein said at least one passage comprises at least one of:
   a substantially semi-circular opening;
   a substantially semi-elliptical opening; and
   a substantially rectangular opening.

8. A stator assembly in accordance with claim 6 wherein said opening extends through said stator ring segment, wherein said at least one wall forms a first predetermined angle with said stator ring segment radially innermost portion and a second predetermined angle with said stator ring segment radially outermost portion.

9. A stator assembly in accordance with claim 6 wherein said at least one passage is further defined by at least one wall formed in at least a portion of said stator blade.

10. A stator assembly in accordance with claim 4 wherein said stator blade and said at least one stator blade passage comprise a dovetail configuration.

11. A stator assembly in accordance with claim 4 wherein said fluid transport assembly comprises a compressor.

12. A gas turbine engine comprising:
   a turbine; and a compressor rotatably coupled to said turbine, said compressor comprising a substantially cylindrical casing comprising a radially inner surface, at least one stator ring passage formed within at least a portion of said radially inner surface, at least one stator ring segment inserted within at least a portion of said at least one stator ring passage, at least one stator blade passage formed in at least a portion of said at least one stator ring segment, at least one stator blade comprising a dovetail portion inserted into at least a portion of said stator blade passage, and at least one radial passage formed within at least one of at least a portion of said at least one stator ring segment and at least a portion of said dovetail portion, said at least one radial passage is at least partially adjacent to said at least one stator blade passage.

13. A gas turbine engine in accordance with claim 12 wherein said at least one radial passage is defined at a predetermined axial and circumferential position within said at least one stator ring segment.

14. A gas turbine engine in accordance with claim 12 wherein said at least one passage is at least partially defined by at least one wall formed within at least a portion of said at least one stator ring segment, by an opening formed in a radially innermost portion of said at least one stator ring segment, and by a radially outermost portion of said at least one stator ring segment.

15. A gas turbine engine in accordance with claim 14 wherein said at least one passage comprises at least one of:
   a substantially semi-circular opening;
   a substantially semi-elliptical opening; and
   a substantially rectangular opening.

16. A gas turbine engine in accordance with claim 14 wherein said opening extends through said stator ring segment, wherein said at least one wall forms a first predetermined angle with said stator ring segment radially innermost portion and a second predetermined angle with said stator ring segment radially outermost portion.

17. A fluid transport assembly in accordance with claim 14 wherein said at least one passage is further defined by at least one wall formed in at least a portion of said at least one stator blade.

* * * * *